US012602550B2

(12) United States Patent
Abdi et al.

(10) Patent No.: US 12,602,550 B2
(45) Date of Patent: Apr. 14, 2026

(54) NATURAL LANGUAGE DRIVEN PLANNING WITH MACHINE LEARNING MODELS

(71) Applicant: MICROSOFT TECHNOLOGY LICENSING, LLC, Redmond, WA (US)

(72) Inventors: Amir H. Abdi, Vancouver (CA); Nitin Kumar Goel, Redmond, WA (US); Daniel Lee Mace, Bellevue, WA (US); William Blum, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 256 days.

(21) Appl. No.: 18/212,687

(22) Filed: Jun. 21, 2023

(65) Prior Publication Data

US 2024/0428007 A1     Dec. 26, 2024

(51) Int. Cl.
 *G06F 17/00*        (2019.01)
 *G06F 16/334*       (2025.01)
      (Continued)

(52) U.S. Cl.
 CPC .......... *G06F 40/40* (2020.01); *G06F 16/3347* (2019.01); *G06F 40/30* (2020.01)

(58) Field of Classification Search
 None
 See application file for complete search history.

(56) References Cited

U.S. PATENT DOCUMENTS

| | | | |
|---|---|---|---|
| 11,580,150 B1 * | 2/2023 | Gutta | ...................... G06F 40/44 |
| 2022/0277142 A1 * | 9/2022 | Mohan | .............. G06F 16/90332 |

(Continued)

FOREIGN PATENT DOCUMENTS

| | | | | |
|---|---|---|---|---|
| WO | WO-2023022727 A1 * | 2/2023 | .......... | G06F 16/243 |

OTHER PUBLICATIONS

Chan Hee Song et al., LLM-Planner: Few-Shot Grounded Planning for Embodied Agents with Large Language Models, arxiv.org, Cornell University Library, 201 Olin Library Cornell University Ithaca, NY 14853, Mar. 19, 2023 (Mar. 19, 2023 ), XP091461322, pp. 1-5, Figure 2 (Year: 2023).*

(Continued)

*Primary Examiner* — Satwant K Singh
(74) *Attorney, Agent, or Firm* — David Foster; Newport IP, LLC

(57)           ABSTRACT

Machine learning models are used to generate a plan that responds to a user request. The plan includes one or more skills selected from a list of available skills. The prompt may be written in natural language, enabling the user to express their intent without having to know which skills are available or their intricacies. In some configurations, a skill is included in the plan if an embedding representation of an example prompt associated with the skill is within a defined distance of an embedding representation of the user request. Additionally, or alternatively, the embedding distance computations are used to narrow the list of available skills, which is then used to construct a meta-prompt that selects a skill. Skills listed in the meta-prompt may include data types of parameters and return values. This allows the model that processes the meta-prompt to order skills based on data type compatibility.

20 Claims, 7 Drawing Sheets

(51) Int. Cl.
  G06F 40/30        (2020.01)
  G06F 40/40        (2020.01)

(56)                References Cited

U.S. PATENT DOCUMENTS

2023/0119161 A1 *   4/2023   Yadaw  .................... G06F 40/30
                                                            707/706
2024/0378196 A1 *  11/2024   Lester  .................... G06N 20/00

OTHER PUBLICATIONS

International Search Report and Written Opinion received for PCT Application No. PCT/US2024/034644, mailed on Oct. 17, 2024, 17 pages.
O'Hare, et al., "Money & Trust in Digital Society—Bitcoin, Nostr, Stablecoins, Digital Objects and Machine Learning in B2B Telepresent Mixed Reality", Arxiv.Org, Mar. 2022, 490 pages.
Song, et al., "LLM-Planner: Few-Shot Grounded Planning for Embodied Agents with Large Language Models", arXiv:2212. 04088v2, Mar. 19, 2023, 14 pages.
Zhang, et al., "Meta Prompting for AI Systems", arXiv:2311. 11482v5, Apr. 2, 2024, 38 pages.
Wei, et al., "Emergent Abilities of Large Language Models", In repository of arXiv:2206.07682v1, Jun. 15, 2022, 16 Pages.
International Preliminary Report on Patentability (Chapter I) received for PCT Application No. PCT/US2024/034644, Jan. 2, 2026, 11 pages.

* cited by examiner

Figure 7:
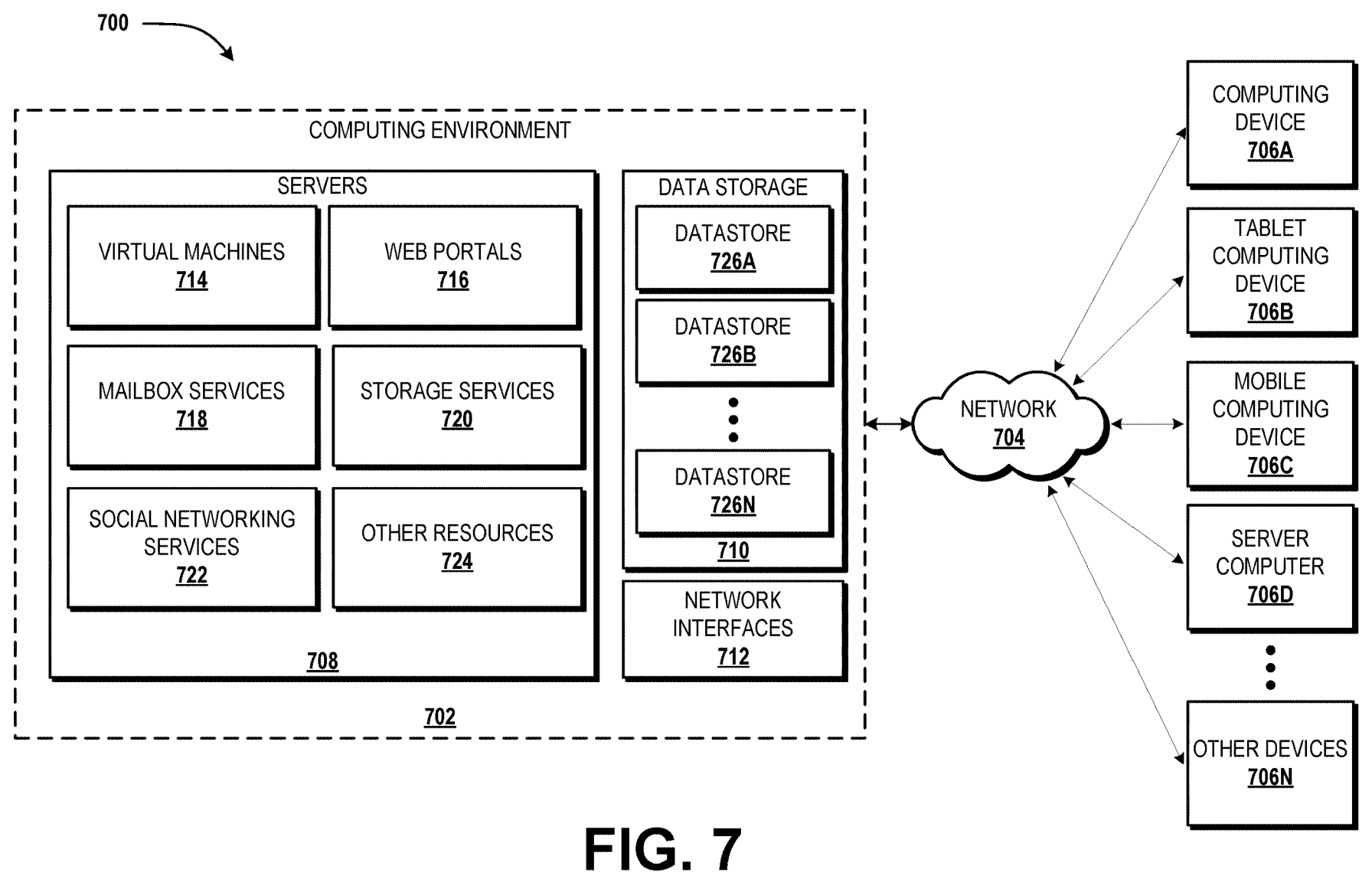

COMPUTING DEVICE 706A

TABLET COMPUTING DEVICE 706B

MOBILE COMPUTING DEVICE 706C

SERVER COMPUTER 706D

OTHER DEVICES 706N

NETWORK 704

COMPUTING ENVIRONMENT

DATA STORAGE

DATASTORE 726A

DATASTORE 726B

DATASTORE 726N

710

NETWORK INTERFACES 712

SERVERS

VIRTUAL MACHINES 714

WEB PORTALS 716

MAILBOX SERVICES 718

STORAGE SERVICES 720

SOCIAL NETWORKING SERVICES 722

OTHER RESOURCES 724

NATURAL LANGUAGE DRIVEN PLANNING WITH MACHINE LEARNING MODELS

BACKGROUND

Software tools are often underutilized. Underutilization is due in part to a lack of education and awareness. Other factors include user interfaces that are not intuitive and the difficulty of finding a particular tool in a large and ever-expanding selection of software applications. For example, security analysts have a large selection of tools and techniques at their disposal when investigating security breaches. However, even highly trained security analysts are often unaware of all of these tools or how to best utilize them.

It is with respect to these and other considerations that the disclosure made herein is presented.

SUMMARY

Machine learning models are used to generate a plan that responds to a user request. The plan includes one or more skills selected from a list of available skills. The prompt may be written in natural language, enabling the user to express their intent without having to know which skills are available or their intricacies. In some configurations, a skill is included in the plan if an embedding representation of an example prompt associated with the skill is within a defined distance of an embedding representation of the user request. Additionally, or alternatively, the embedding distance computations are used to narrow the list of available skills, which is then used to construct a meta-prompt that selects a skill. Skills listed in the meta-prompt may include data types of parameters and return values. This allows the model that processes the meta-prompt to order skills based on data type compatibility.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 7 is a diagram illustrating a distributed computing environment capable of implementing aspects of the techniques and technologies presented herein.

DETAILED DESCRIPTION

Figure 1:
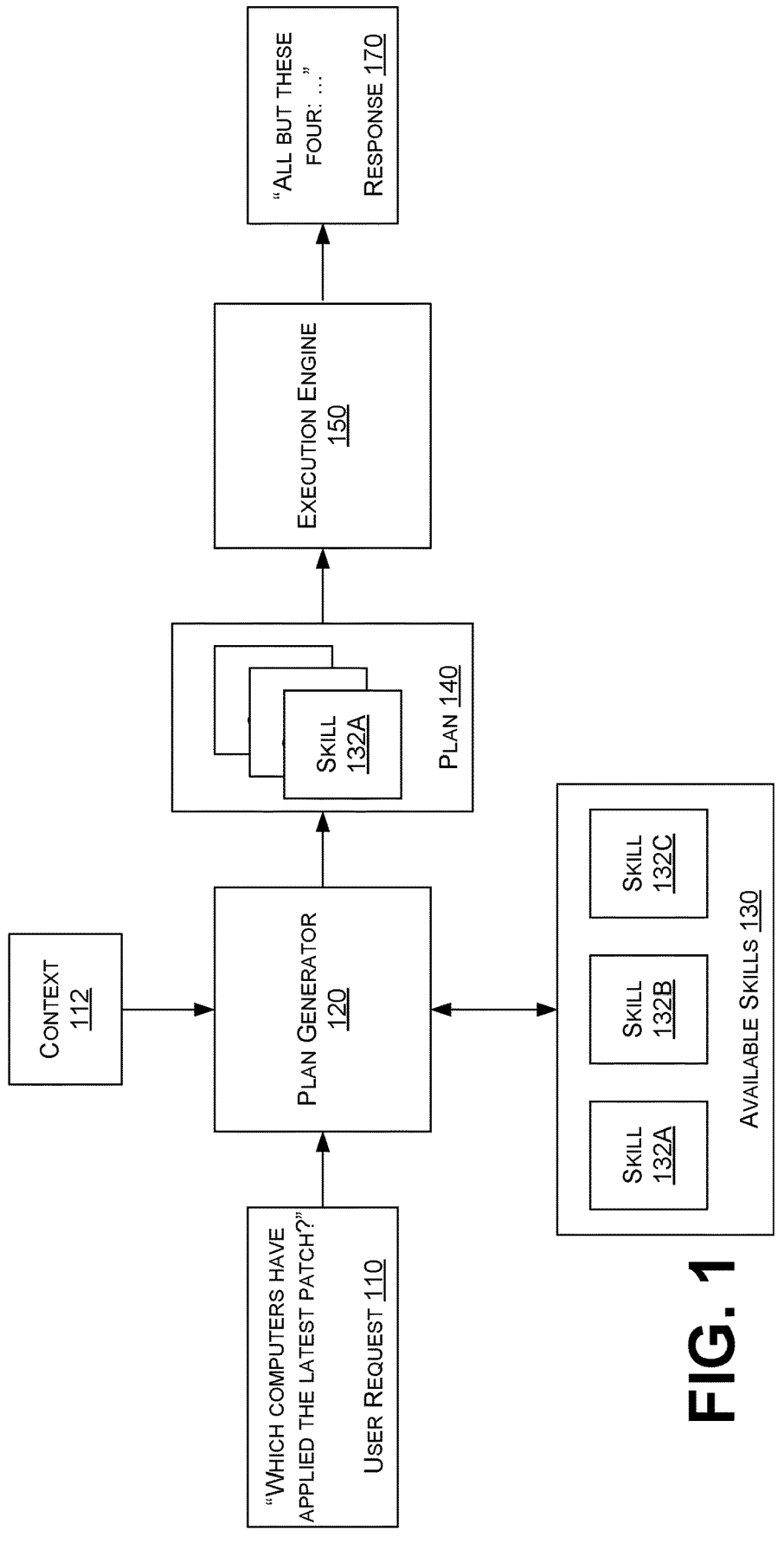
FIG. 1 illustrates generating a plan that responds to a user request.

FIG. 1 illustrates generating a plan that responds to a user request. User request 110 may be written in a natural language, such as English. Natural language in this context refers to language that a person might use when talking to another person. Allowing natural language prompts relieves the user of the burden of understanding specific commands, a grammar, or other peculiarities of traditional human-machine interfaces. Natural language also makes it easier for a user to compose prompts that combine skills, making it easier to compose multiple skills.

As illustrated, user request 110 asks "which computers have applied the latest security patch?". This is an example of the kind of prompt that a security analyst might provide to a service that assists with computer and network security. However, this is just one example of a security-related prompt, and a computer security service is just one example of a service that utilizes natural language driven planning with machine learning models.

Plan generator 120 receives user request 110, and in conjunction with context 112, selects one or more skills 132 from available skills 130. Plan 140 is generated in part from the collection of skills 132 that have been selected. Plan 140 may describe an order in which skills 132 are executed. Plan 140 may also describe parameter values used to invoke the skills. When plan 140 has multiple skills 132, plan 140 may indicate how return values from one skill are provided as input to another skill. Plan 140 may also modify values before they are provided as parameters to a skill or after they are returned by a skill. As described herein, selecting skills 132 and arranging them into a plan 140 is referred to as "planning."

As referred to herein, a skill 132 performs a function, such as retrieving information or performing an operation. For example, in an information technology (IT) context, a skill may gather, synthesize, or output information about computing devices and network resources. In a security context, skill 132 may enumerate computers that have received patches, or determine whether a particular computer has applied the latest patch. A skill may also perform some function without reference to an external resource, such as summarizing text, formatting text, converting between file formats, or other operations that can be performed on a piece of data. In some configurations, skill 132 is capable of executing code and including invoking other tools.

Plan generator 120 may use an embedding-based planning technique, a meta-prompt-based planning technique, or a hybrid technique. Embedding-based planning techniques are discussed below in conjunction with FIG. 2. Meta-prompt-based planning techniques are discussed below in conjunction with FIG. 3. A hybrid technique that uses the embedding-based planning technique to narrow the candidate skills for a meta-prompt based planning technique is described in conjunction with FIG. 4.

Plan 140 may be put into operation by execution engine 150. Execution engine 150 may execute skills 132 as defined by plan 140. Execution engine 150 may provide the outputs of some skills 132 as inputs to other skills 132, enabling more complex operations to satisfy user request 110. Execution engine 150 may utilize foundational machine learning models, such as large language models, to generate response 170, which is provided in response to user request 110.

A natural language-based system described herein, such as a service that enables security analysts to quickly and conveniently perform complex operations, increases productivity by allowing the user to interact with the service in a natural, conversational manner. Productivity is also increased because plan generator 120 may employ machine learning models to connect existing tools that would otherwise require significant manual manipulation to work together.

User request 110 and response 170 are text-based, but text-based input and output is just one example of the types of inputs and outputs that can be processed by foundation models used by plan generator 120 and/or execution engine 150. Plan generator 120 and/or execution engine 150 may similarly process images or voice commands. In the context of a security-focused service, plan generator 120 may process a screenshot of an error message displayed by a computer. Similarly, execution engine 150 may generate a response 170 that includes a flow-chart, graphics, a video, audio, or any other type of media.

Context 112 refers to information about the user, including past conversations with plan generator 120, past interactions with computing devices, files, network resources, or other subjects of user request 110. Context 112 may also include user preferences.

An example of user request 110 from a security focused embodiment is "Tell me about CVE-2023-12345", where a "CVE" is a Common Vulnerability or Exploit. Response 170 may be:

```
System invokes the following skills in this order (represented in pseudocode):
    Incident = GetCveById(CVE-2023-12345)
    summary = Summarize(incident)
    ComposeFinalResponse(summary)"
```

Another example user request from a security focused embodiment is "Enrich IP addresses with threat intelligence related to incident 12345 in workspace my-company-work-space." Response 170 may be:

```
System invokes the following skills in this order (represented in pseudocode):
    entities = GetIncidentEntities(12345, my-company-workspace)
    ipParams = GetIpParams(entities)
    ipDataCardSkillTask = GetDataCardByIpAddress(ipParams)
    reputationByAddressSkillTask = GetReputationByAddress(ipParams)
    ComposeFinalResponse([ipDataCardSkillTask, reputationByAddressSkillTask])
```

Figure 2:
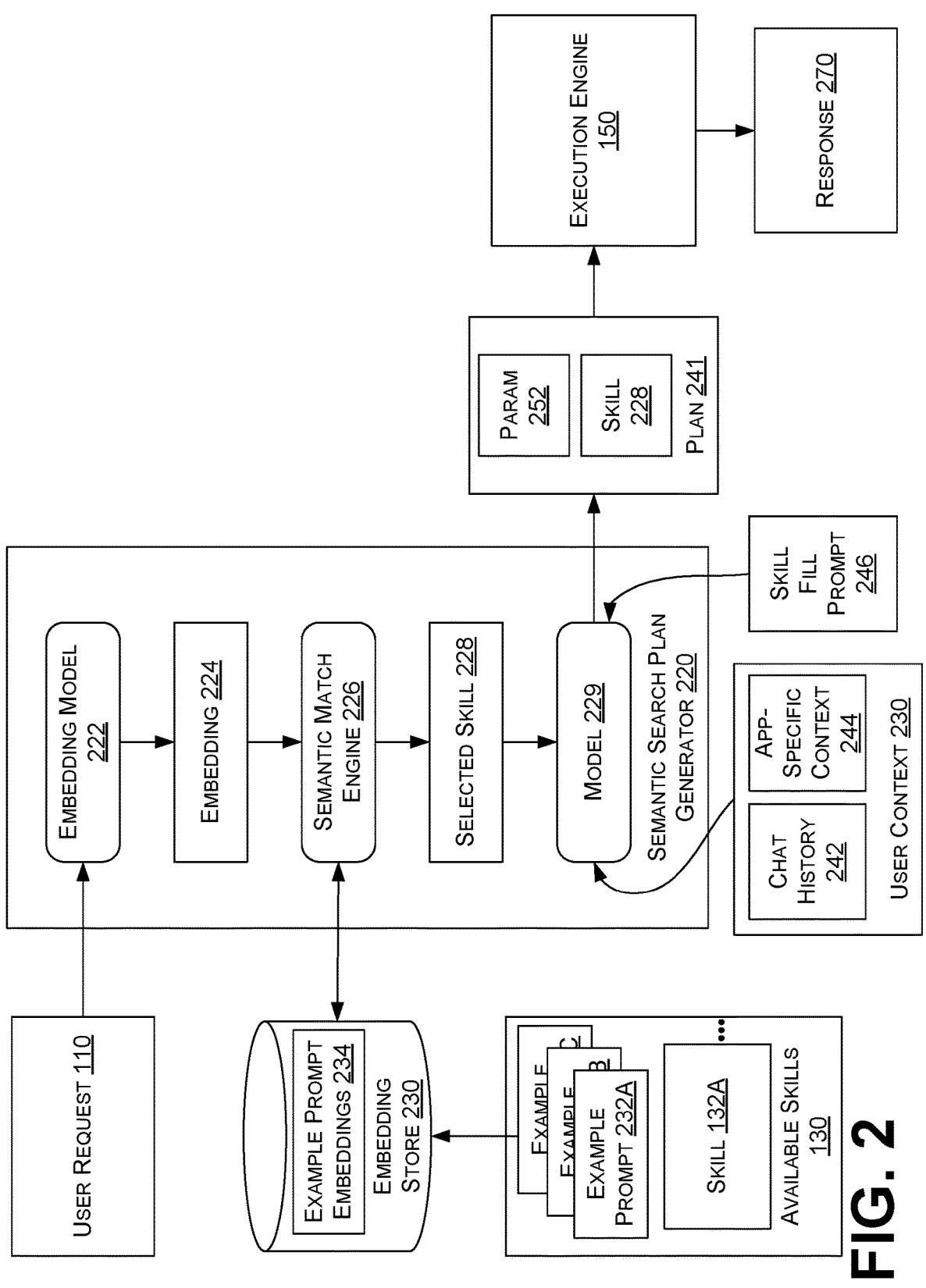
FIG. 2 illustrates generating a plan by comparing an embedding of the user request with embeddings of example prompts associated with the available skills.

FIG. 2 illustrates generating a plan by comparing an embedding of the user request with embeddings of example prompts associated with the available skills. As referred to herein, embedding 224 is a multi-dimensional, numeric representation of user request 110. Embeddings are learned representations, meaning they represent how embedding model 222 understands user request 110. Embeddings are typically high-dimensional vectors, and proximity in this vector space indicates a semantic relationship between two embeddings. For example, the user request "Which computers have applied the latest patch" and the prompt "List devices with up-to-date patches" may have embeddings that are closer together than the prompt "print out a list of usernames that have logged into my laptop" has to either of them.

Each skill 132 of available skills 130 is associated with one or more example prompts 232. Example prompts 232 are created as examples of prompts that would be expected to yield skill 132. For example, a skill 132A may have the name "GetIntuneDevicesForUser", and may take a parameter that identifies a user. The "GetIntuneDevicesForUser" skill may retrieve a list of computing devices associated with the particular user. Example prompts for this skill may be curated by an expert or derived from usage data. Some examples of example prompts 232 for the "GetIntuneDevicesForUser" skill are "Get all machines associated with", "Get the devices for [user]", and "Which Intune machines associated [user]". Each of these example prompts 232 may be pre-computed by embedding model 222 to generate corresponding example prompt embeddings 234, which are stored in embedding stored 230. Associating multiple example prompts 232 with a skill 132 enables more chances for embedding 224 to match to a particular skill 132.

Semantic search plan generator 220 receives user provided prompt 110. Embedding model 222 processes user request 110 to generate embedding 224. Embedding 224 is provided to semantic match engine 226, which uses embedding 224 to construct a query for retrieving related embeddings 234, and the associated skills 132, from embedding store 230. In some configurations embedding store 230 is a vector database that natively stores and retrieves vectors. Vectors may be retrieved based on distance, such as based on a Euclidian distance, a cosine similarity, or other distance metric. The query may include a minimum distance, a maximum number of neighbors to retrieve, or skill metadata on which to filter results. Embedding store 230 performs the query and returns a list of example prompt embeddings 234 and corresponding skills 132. The list may include zero, one, or many results. In some configurations, semantic match engine 226 selects the skill 228 as the skill with the example prompt embedding 234 that is closest to embedding 224.

Selected skill 228 is provided to machine learning model 229, which is trained to fill out parameters of selected skill 228. Machine learning model 229 may be a language model such as an auto-regressive generative language model, or any other type of model such as a Generative Adversarial Network (GAN), Diffusion model, and/or any other generative LLM. Skills 132 may be parameterized. For example, the skill named "GetIntuneDevicesForUser" may have a parameter that specifies the user. Model 229 is provided with a prompt 246 that includes selected skill 228 and some or all of user context 230. Prompt 246 may ask model 229 to identify parameters 252 with which to invoke skill 228. Model 229 generates plan 241, including skill 228 or a reference to skill 228 and parameter(s) 252. Execution engine 150 may then invoke plan 241 by providing parameters 252 when invoking skill 228. Execution engine 150 may return response 270 in response to user request 110.

Figure 3:
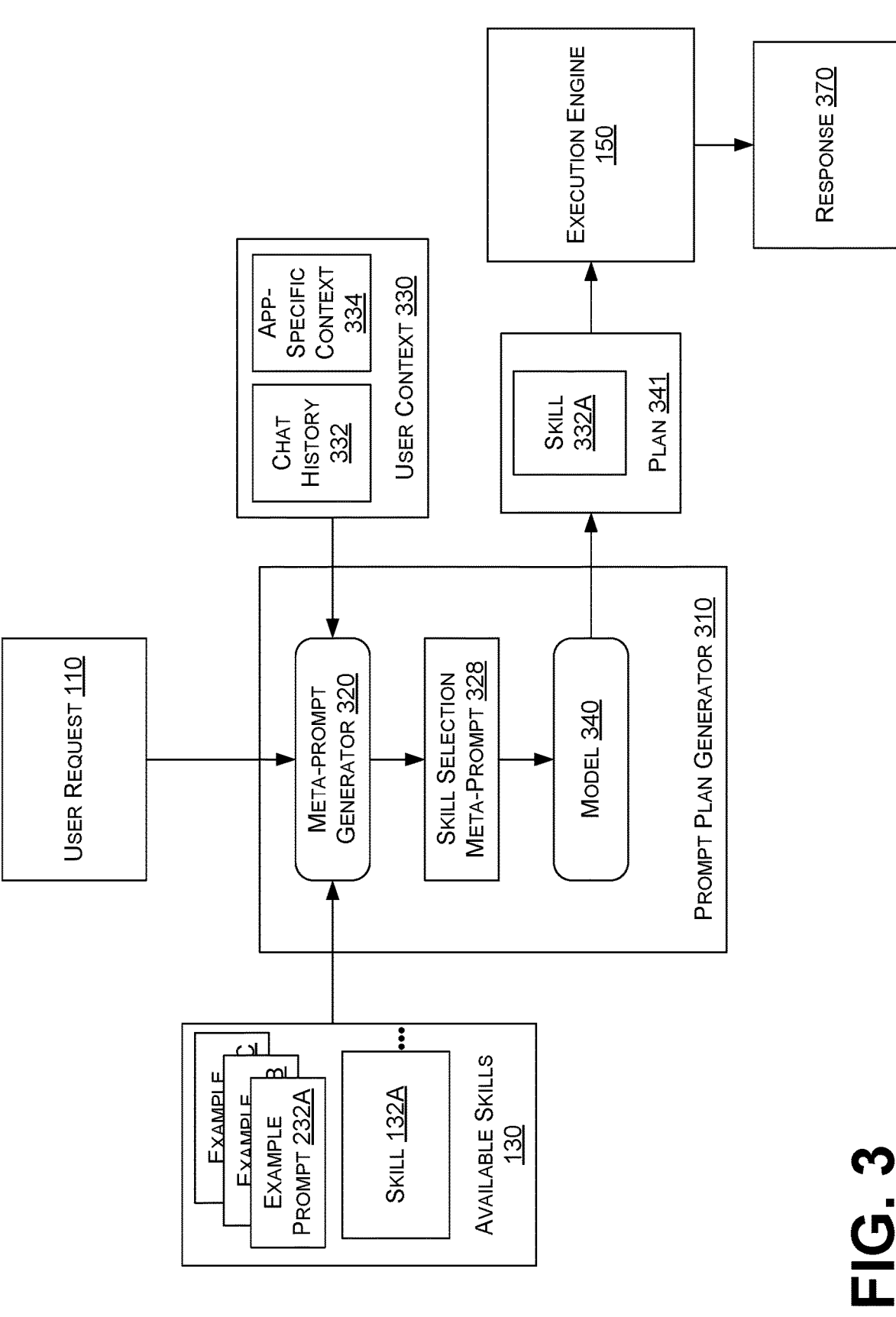
FIG. 3 illustrates generating a plan by constructing a meta-prompt that includes the list of available skills.

FIG. 3 illustrates generating a plan by constructing a meta-prompt that includes the list of available skills. For example, meta-prompt generator 320 of prompt plan generator 310 constructs a meta-prompt 328 that, when provided to machine learning model 340, constructs plan 341 including one or more skills 332. Machine learning model 340 may be a language model such as an auto-regressive generative language model, or any other type of model such as a Generative Adversarial Network (GAN), Diffusion model, and/or any other generative LLM. In this context, a meta-prompt refers to a prompt that, when processed by a machine learning model, yields another prompt.

Skill selection meta-prompt 328 may be a text file with a number of sections. Some or all of the sections may be customized to a particular type of service. For example, a security service may have an objective section that instructs model 340 to take on the role of a security analyst. The security service may clarify that model 340 will be given a list of allowed functions, and that it is to match the intent and the data of user prompt 110. Model 340 may further be instructed to write a formatted command that invokes a skill if an appropriate match can be found. Skill selection meta-prompt 328 may include context, such as the time of day or the user's chat history.

In some configurations, skill selection meta-prompt 328 is generated to include a list of allowable skills. The list of allowable skills may be represented as a table. When prompt plan generator 310 operates independently, the list of available skills 132 is retrieved from available skills 130. The list of allowable skills may include a description of each skill, a list of parameters of each skill, and a return value provided by each skill.

In some configurations, each parameter and each return value is associated with a data type, such as 'string' for a sequence of characters or 'int' for an integer number. Including data types in skill definitions enables model 340 to leverage the large amount of source code in various programming languages that it has been trained on to infer which skills may be orchestrated together based on their matching input arguments and output types.

Given the meta-prompt 328 that has been customized to the list of available skills 130, model 340 is tasked to choose the correct skill(s) among the available skills in response to the user prompt 110. Meta-prompt 328 instructs model 340 to do this in part by extracting skill parameters from user context 330, such as chat history 332 and/or application specific context 334. The sequence of skills identified by processing meta-prompt 328, their parameters, and their inter-dependencies is represented by plan 341. Plan 341 is provided to execution engine 150 to generate response 370, which is provide in response to user request 110.

Figure 4:
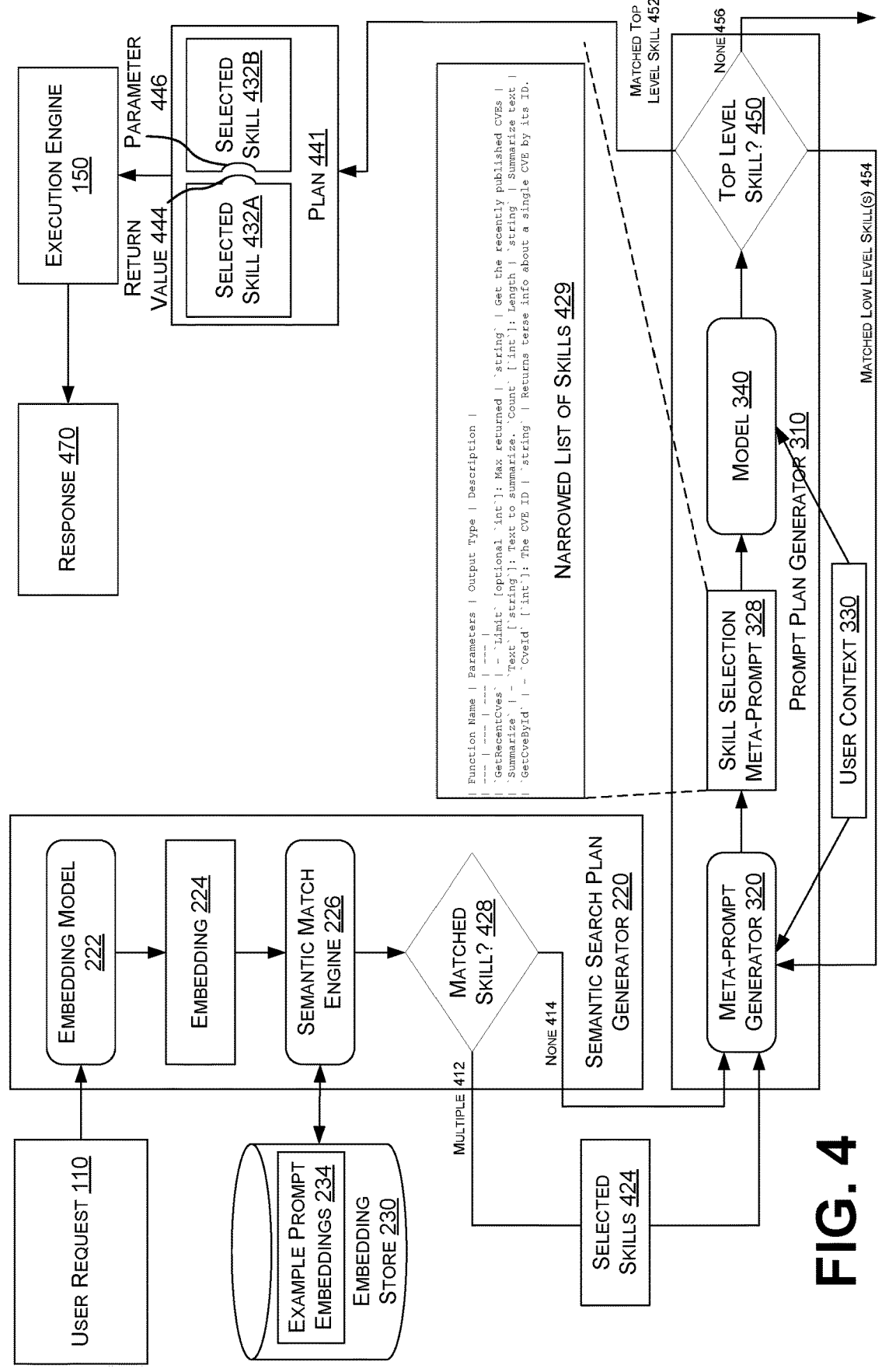
FIG. 4 illustrates a hybrid technique for generating a plan in which the semantic search plan generator narrows the list of available skills for inclusion in the meta-prompt.

FIG. 4 illustrates a hybrid technique for generating a plan in which the semantic search plan generator narrows the list of available skills for inclusion in the meta-prompt. As discussed above in conjunction with FIG. 2, semantic search plan 220 receives user request 110, processes it to generate embedding 224, and uses embedding 224 to retrieve skills 132 with example prompt embeddings 234 within a defined distance of embedding 224.

However, the hybrid planning depicted in FIG. 4 allows for scenarios in which multiple skills or no skills are retrieved from embedding store 230. Specifically, matched skill determination 428 determines whether multiple skills 412 or no skills 414 matched the criteria of the query sent to embedding store 230. When multiple skills are returned, selected skills 424 are provided to prompt plan generator 310. Meta-prompt generator 320 of prompt plan generator 310 uses the selected skills 424 when constructing skill selection meta-prompt 328. For example, skill-selection meta-prompt 328 may be constructed from a template by replacing a placeholder with narrowed list of skills 429.

Narrowed list of skills 429 illustrates a list of skills from skill selection meta-prompt 328 that has fewer entries than if all available skills 130 were included. Narrowed list of skills 429 also illustrates one format in which skill name, description, parameters, and return value are formatted for consumption by model 340.

Using semantic search plan generator 220 to pre-filter the skills included in skill selection meta-prompt 328 allows for a greater number of available skills 130 to be considered, and at a reduced cost. This is accomplished by reducing the number of skills that are processed by model 340, which may have a limited number of tokens that can be considered, and which may cost more when selection meta-prompt 328 includes a large list of skills. Reducing the number of skills for skill selection meta-prompt 340 to consider also improves performance. It also improves results by reducing name collisions and other ambiguities of skill names, parameter names, or descriptions.

Model 340 may be an autoregressive large language model. When processing skill selection meta-prompt 328, model 340 generates plan 441. Plan 441 is a sequence of instructions that will be invoked in an orderly fashion to complete the selected skills 432 and generate the response 470.

Each instruction in plan 441 could possibly be a skill 132. Additionally, or alternatively, non-skill instructions can be permitted by model 340. For example, if plan 441 is realized as a Python executable code, then, an instruction could be void of any skills 132, but instead include Python code.

As illustrated, plan 441 has two skills, selected skill 432A and selected skill 432B. Selected skill 432 is executed first, and return value 444 of selected skill 432A is provided, directly or indirectly, as a parameter 446 of selected skill 432B. Execution engine 150 processes plan 441 to generate response 470 as discussed above in conjunction with FIG. 2.

Figure 5:
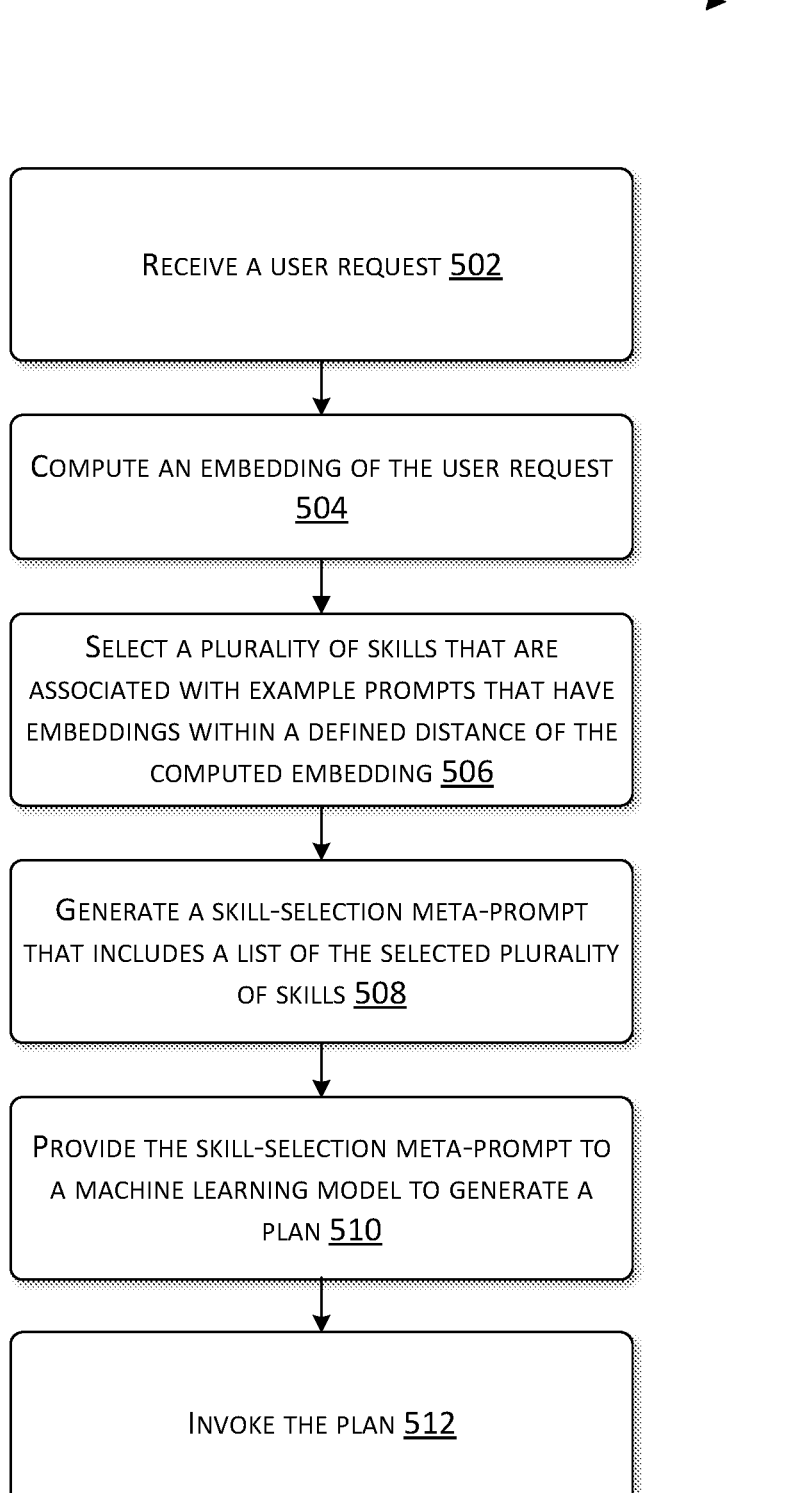
FIG. 5 is a flow diagram of an example method for natural language driven planning with machine learning models.

FIG. 5 is a flow diagram of an example method for natural language driven planning with machine learning models. Routine 500 begins at operation 502, where a user request 110 is received.

Next at operation 504, an embedding 224 of the user request 110 is computed.

Next at operation 506, a plurality of skills 132 that are associated with example prompts 232 that have embeddings 234 within a defined distance of the embedding 224 are retrieved from embedding store 230. In some configurations, a query is submitted to embedding store 230 that defines the distance, a maximum number of values to return, and meta-data filter criteria.

Next at operation 508, a skill-selection meta-prompt 328 is constructed to include a table of skills 429 that were retrieved from embedding store 230.

Next at operation 510, the skill-selection meta-prompt is provided to an autoregressive large language model 340 to generate a plan 441 that includes one or more of the skills listed in table 429.

Next, at operation 512, the plan 441 is executed.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 6:
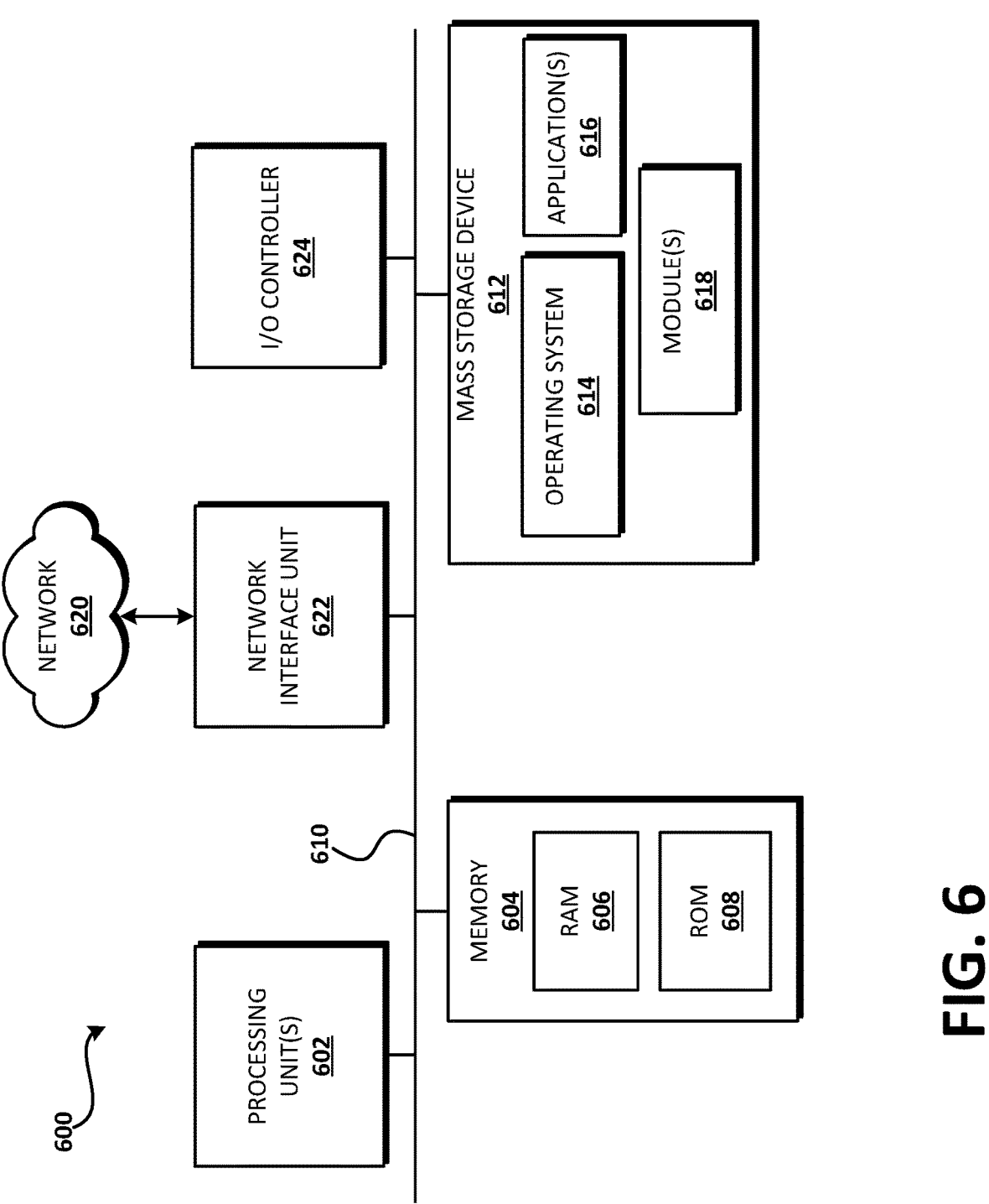
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the systems described herein, capable of executing computer instructions (e.g., a module or a program component described herein). The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a neural processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or, social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the servers 708 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The present disclosure is supplemented by the following example clauses:

Example 1: A method comprising: receiving a user request; computing an embedding of the user request; selecting a plurality of skills that are each associated with at least one example prompt embedding that is within a defined distance of the embedding; generating a skill selection meta-prompt that includes a list of the plurality of skills; providing the skill selection meta-prompt to a machine learning model; receiving a plan from the machine learning model that includes at least one skill; and invoking the plan.

Example 2: The method of Example 1, wherein the embedding and the at least one example prompt embedding are generated by an embedding model.

Example 3: The method of Example 2, wherein the plurality of skills are selected from a plurality of available skills, wherein each of the plurality of available skills is associated with at least one example prompt, and wherein the at least one example prompt embedding is generated by providing the embedding model with at least one example prompt.

Example 4: The method of Example 3, wherein the at least one example prompt is pre-computed and stored in a vector database.

Example 5: The method of Example 1, wherein the at least one example prompt encoding is determined to be within the defined distance of the embedding based on a cosine similarity.

Example 6: The method of Example 1, wherein the at least one skill has at least one placeholder value, wherein the machine learning model is provided with a user context, and wherein the machine learning model fills in the at least one placeholder value when processing the meta-prompt.

Example 7: The method of Example 1, wherein at least one entry of the list of the plurality of skills includes a data type of a parameter or a data type of a return value.

Example 8: A system comprising: a processing unit; and a computer-readable storage medium having computer-executable instructions stored thereupon, which, when executed by the processing unit, cause the processing unit to: receive a user request; compute an embedding of the user request; select a skill that is associated with an example prompt embedding that is closest to the embedding; provide the selected skill and a user context to a machine learning model; receive a plan from the machine learning model that includes the at least one skill customized to the current user context; and invoke the plan.

Example 9: The system of Example 8, wherein invoking the plan generates a response to the user request, and wherein the instructions further cause the processing unit to: generate a response based on invoking the plan; and returning the response to the user.

Example 10: The system of Example 8, wherein the user context includes a chat history.

Example 11: The system of Example 8, wherein the machine learning model comprises a auto-regressive generative language model.

Example 12: The system of Example 8, wherein the skill is selected by searching a vector database for an example prompt embedding that is closest to the embedding.

Example 13: The system of Example 8, wherein the at least one example prompt encoding is determined to be within the defined distance of the embedding based on a Euclidian distance.

Example 14: The system of Example 8, wherein a skill fill prompt sent to the machine learning model causes the machine learning model to replace placeholder parameters with values extracted from the user context.

Example 15: A computer-readable storage medium having encoded thereon computer-readable instructions that when executed by a processing unit causes a system to: receive a user request; compute an embedding of the user request; select a plurality of skills that are each associated with at least one example prompt embedding that is within a defined distance of the embedding; generate a skill selection meta-prompt that includes a list of the plurality of skills, wherein a return value of a first skill of the plurality of skills and a parameter of a second skill of the plurality of skills have a same data type; provide the skill selection meta-prompt to a machine learning model; receive a plan from the machine learning model in which the return value of the first skill is provided to the parameter of the second skill; and invoke the plan.

Example 17: The computer-readable storage medium of Example 16, wherein generating the skill selection meta-prompt comprises replacing a placeholder value with a table representation of the plurality of skills.

Example 18: The computer-readable storage medium of Example 17, the table representation of the plurality of skills includes a name and a description of each skill and a name of each parameter of each skill.

Example 19: The computer-readable storage medium of Example 18, wherein the table representation of the plurality of skills includes a data type for a return value of each skill.

Example 20: The computer-readable storage medium of Example 16, wherein selected plurality of skills does not have any skills, and wherein the list of the plurality of skills in the skill-selection meta-prompt comprises a plurality of low-level skills.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
receiving a user request;
computing an embedding of the user request;
selecting a subset of a plurality of example prompts by:
    comparing the embedding of the user request to embeddings of the plurality of example prompts, and
    selecting the subset of the plurality of example prompts that have prompt embeddings within a defined distance of the embedding of the user request;
identifying a plurality of skills referenced by the subset of the plurality of example prompts;
generating a skill selection meta-prompt that includes a list of the plurality of skills;
providing the skill selection meta-prompt to a machine learning model;

receiving a plan from the machine learning model that includes at least one skill; and invoking the plan.

2. The method of claim 1, wherein the embedding and the at least one example prompt embedding are generated by an embedding model.

3. The method of claim 2, wherein the plurality of skills are selected from a plurality of available skills, wherein each of the plurality of available skills is associated with at least one example prompt, and wherein the at least one example prompt embedding is generated by providing the embedding model with at least one example prompt.

4. The method of claim 3, wherein the at least one example prompt embedding is pre-computed and stored in a vector database.

5. The method of claim 1, wherein the at least one example prompt embedding is determined to be within the defined distance of the embedding based on a cosine similarity.

6. The method of claim 1, wherein the at least one skill has at least one placeholder value, wherein the machine learning model is provided with a user context, and wherein the machine learning model fills in the at least one placeholder value when processing the meta-prompt.

7. The method of claim 1, wherein at least one entry of the list of the plurality of skills includes a data type of a parameter or a data type of a return value.

8. A system comprising:

a processing unit; and a computer-readable storage medium having computer-executable instructions stored thereupon, which, when executed by the processing unit, cause the processing unit to:

receive a user request;

compute an embedding of the user request;

select a subset of a plurality of example prompts by:

comparing the embedding of the user request to embeddings of the plurality of example prompts, and selecting the subset of the plurality of example prompts that have prompt embeddings within a defined distance of the embedding of the user request;

identify a plurality of skills referenced by the subset of the plurality of example prompts;

provide the plurality of skills and a user context to a machine learning model;

receive a plan from the machine learning model that includes at least one of the plurality of skills customized to the current user context; and invoke the plan.

9. The system of claim 8, wherein invoking the plan generates a response to the user request, and wherein the instructions further cause the processing unit to:

return the response to the user.

10. The system of claim 8, wherein the user context includes a chat history.

11. The system of claim 8, wherein the machine learning model comprises a auto-regressive generative language model.

12. The system of claim 8, wherein the plurality of skills are selected by searching a vector database for example prompt embeddings that are within a defined distance of the embedding.

13. The system of claim 8, wherein the defined distance of the embedding of the user request is computed based on a Euclidian distance.

14. The system of claim 8, wherein a skill fill prompt sent to the machine learning model causes the machine learning model to replace placeholder parameters with values extracted from the user context.

15. A non-transitory computer-readable storage medium having encoded thereon computer-readable instructions that when executed by a processing unit causes a system to:

receive a user request;

compute an embedding of the user request;

select a subset of a plurality of example prompts by:

comparing the embedding of the user request to embeddings of the plurality of example prompts, and selecting the subset of the plurality of example prompts that have prompt embeddings within a defined distance of the embedding of the user request;

identify a plurality of skills referenced by the subset of the plurality of example prompts;

generate a skill selection meta-prompt that includes a list of the plurality of skills, wherein a return value of a first skill of the plurality of skills and a parameter of a second skill of the plurality of skills have a same data type;

provide the skill selection meta-prompt to a machine learning model;

receive a plan from the machine learning model in which the return value of the first skill is provided to the parameter of the second skill; and invoke the plan.

16. The non-transitory computer-readable storage medium of claim 15, wherein generating the skill selection meta-prompt comprises replacing a placeholder value of a generic skill selection meta-prompt with the list of the plurality of skills.

17. The non-transitory computer-readable storage medium of claim 16, wherein the list of the plurality of skills includes a name and a description of at least one skill and a name of at least one parameter of at least one skill.

18. The non-transitory computer-readable storage medium of claim 17, wherein the list of the plurality of skills includes a data type for the at least one parameter.

19. The non-transitory computer-readable storage medium of claim 15, wherein the list of the plurality of skills includes a data type for a return value of at least one of the plurality of skills.

20. The non-transitory computer-readable storage medium of claim 15, wherein the identified plurality of skills does not have any skills, and wherein the list of the plurality of skills in the skill-selection meta-prompt comprises a plurality of low-level skills.

\* \* \* \* \*